United States Patent
Polcyn et al.

(10) Patent No.: US 9,680,172 B2
(45) Date of Patent: Jun. 13, 2017

(54) FLOW-TYPE ELECTROCHEMICAL CELL

(71) Applicant: ThyssenKrupp Industrial Solutions AG, Essen (DE)

(72) Inventors: Gregor Damian Polcyn, Dortmund (DE); Niels Bredemeyer, Waltrop (DE); Christoph Roosen, Würselen (DE); Dmitri Donst, Köln (DE); Peter Toros, Essen (DE); Peter Woltering, Neuenkirchen (DE); Dirk Hoormann, Werne an der Lippe (DE); Philipp Hofmann, Dortmund (DE); Stephan Köberle, Witten (DE); Frank Funck, Bottrop (DE); Wolfram Stolp, Hamm (DE); Bernd Langanke, Holzwickede (DE)

(73) Assignee: ThyssenKrupp Industrial Solutions AG, Essen (DE)

( * ) Notice: Subject to any disclaimer, the term of this patent is extended or adjusted under 35 U.S.C. 154(b) by 0 days.

(21) Appl. No.: 14/424,901

(22) PCT Filed: Aug. 29, 2013

(86) PCT No.: PCT/EP2013/067954
§ 371 (c)(1),
(2) Date: Feb. 27, 2015

(87) PCT Pub. No.: WO2014/033238
PCT Pub. Date: Mar. 6, 2014

(65) Prior Publication Data
US 2015/0236363 A1  Aug. 20, 2015

(30) Foreign Application Priority Data

Sep. 3, 2012  (DE) .................. 10 2012 017 306

(51) Int. Cl.
*H01M 8/04* (2016.01)
*H01M 8/04276* (2016.01)
(Continued)

(52) U.S. Cl.
CPC ......... *H01M 8/04283* (2013.01); *H01M 8/08* (2013.01); *H01M 8/188* (2013.01); *H01M 8/20* (2013.01); *H01M 2300/0011* (2013.01)

(58) Field of Classification Search
CPC ............. H01M 8/04283; H01M 8/188; H01M 2300/0011; H01M 8/08; H01M 8/20
See application file for complete search history.

(56) References Cited

U.S. PATENT DOCUMENTS

| 193,860 A | 8/1877 | Frazier |
| 4,049,880 A | 9/1977 | Hart |
| (Continued) | | |

FOREIGN PATENT DOCUMENTS

| CA | 2836581 A1 | 11/2012 |
| CN | 1845370 A | 10/2006 |
| DE | 3401638 A1 | 7/1985 |
| WO | 2012022532 | 2/2012 |

OTHER PUBLICATIONS

PCT Patent Application PCT/EP2013/067954 International Search Report dated Oct. 11, 2013, 4 pages.
(Continued)

*Primary Examiner* — Mark F Huff
*Assistant Examiner* — Monique Wills
(74) *Attorney, Agent, or Firm* — Lathrop & Gage L.L.P.

(57) ABSTRACT

Flow type electrochemical cells are disclosed. The electrochemical cell has an anode half-cell, a cathode half-cell, and permeable separating layer. The half-cells are bounded by side elements. Respective porous electrodes are housed in the half-cells. The permeable separating layer is disposed between the anode half-cell and the cathode half-cell. An electrolyte region connected to an electrolyte feed and an electrolyte outflow region connected to an electrolyte drain are further provided. An electrolyte inflow region and an electrolyte outflow region are disposed on opposite sides of (Continued)

the porous electrodes such that inflowing electrolyte flows through the porous electrode perpendicularly to the permeable separating layer.

10 Claims, 4 Drawing Sheets

(51) Int. Cl.
    *H01M 8/18*     (2006.01)
    *H01M 8/20*     (2006.01)
    *H01M 8/08*     (2016.01)

(56) References Cited

U.S. PATENT DOCUMENTS

| | | |
|---|---|---|
| 4,193,860 A | 3/1980 | Folser |
| 4,224,129 A | 9/1980 | Mcintyer et al. |
| 4,652,355 A | 3/1987 | Noding |
| 5,648,184 A | 7/1997 | Inoue et al. |
| 2012/0292196 A1* | 11/2012 | Albrecht .................. C25B 1/00 205/351 |
| 2013/0266829 A1* | 10/2013 | Cole ..................... H01M 8/184 429/51 |

OTHER PUBLICATIONS

CA Application No. 2,883,457, Office Action dated Aug. 29, 2016, 4 pages.

\* cited by examiner

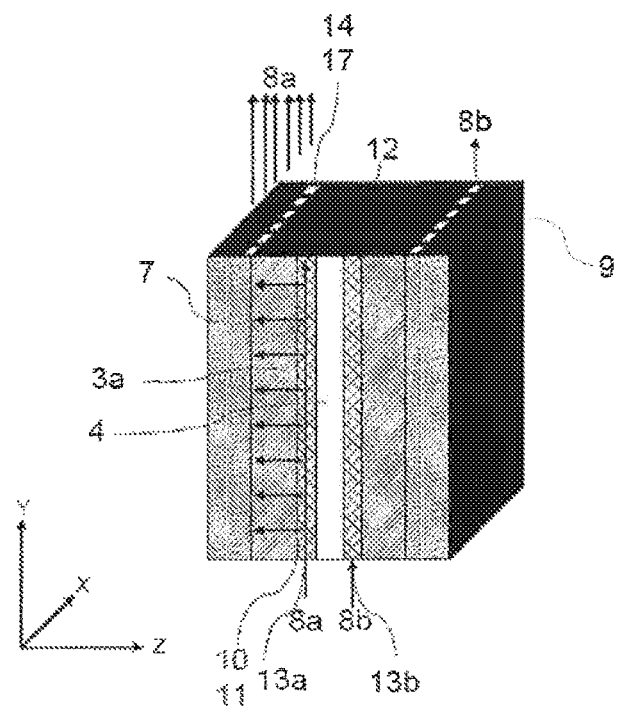
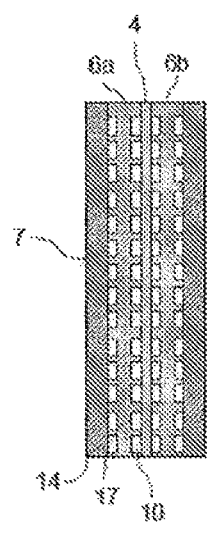 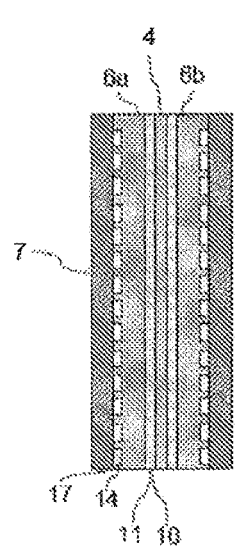 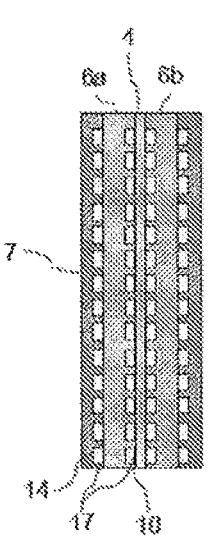

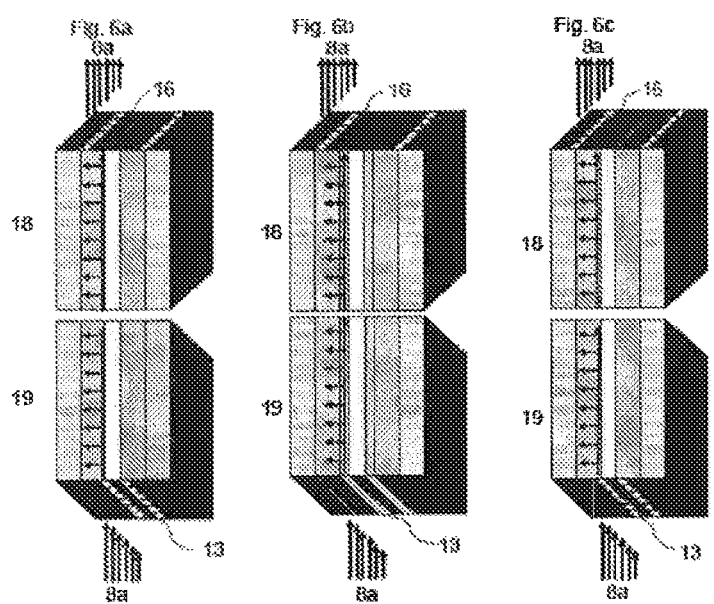

FLOW-TYPE ELECTROCHEMICAL CELL

CROSS-REFERENCE TO RELATED APPLICATIONS

This application is the U.S. national phase of, and claims priority to, International Application No. PCT/EP2013/067954, filed Aug. 29, 2013, which designated the U.S. and which claims priority to German Patent Application No. DE 102012017306.7, filed Sep. 3, 2012. These applications are each incorporated by reference herein in their entireties.

BACKGROUND

Field of the Invention

The invention relates to a specific cell construction for electrochemical cells of the flow type, having minimized pressure drop in comparison to a conventional cell construction, and additionally exhibiting significantly improved flow distribution within the cell. With the electrochemical cell, moreover, a better power is achieved than with cells having a conventional cell construction.

Prior Art

Particularly in connection with changing energy generation, energy storage media are becoming increasingly important. Of particular interest are those examples which offer the possibility of being able to store large amounts of energy and to release it and take it up with high power. Preference here is given to technologies which store and release the energy with maximum efficiency, losing as little energy as possible in so doing, and thereby allowing cost-effective interim storage.

A technology much discussed for this purpose is that of redox flow storage media. A general representation of this technology from the prior art is shown in FIG. 1. In a redox flow storage medium, the energy is stored in the electrolyte in the form of metals, salts, or other chemical compounds, these compounds being present in liquid, dispersed, or dissolved form. The electrolytes are stored in external tanks $1a$, $1b$. For charging or discharging, the electrolytes are pumped through an electrochemical cell 2. In the electrochemical cell 2, through application of a voltage via a network connection 5 to the respective electrodes $3a$, $3b$, by oxidation and reduction reactions, electrical energy is converted into chemical energy during charging and is converted back into electrical energy during discharging. In a generalized form, the reactions taking place at the electrodes are as follows:

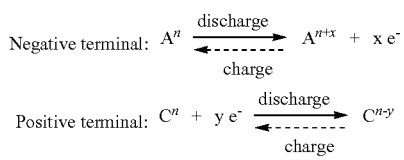

The electrochemical cell 2 consists of two half-cells, the anode side and the cathode side, in which the respective electrodes $3a$, $3b$ are contained. The two half-cells are separated from one another by a permeable separating layer 4 for charge compensation during charging and discharging. For increase in energy, for example, a plurality of such individual cells may be brought together into cell stacks, or the active area of the individual cells can be increased.

The power capacity of an individual cell with a given active area is determined from the combination of cell voltage and current density, in other words the maximum power per unit area. This applies for both directions of the reaction, which takes place reversibly.

In order to achieve a maximum power density per cell, electrodes with a very high surface area are required. The power of a cell is determined by factors including the number of electrochemical reactions per unit time, and the geometric cell area $[mol/(s*m^2)]$. Electrodes having a large surface area per unit geometric surface area therefore have many active centers at which the electrochemical reactions can proceed. Employed for this purpose in accordance with the prior art are three-dimensional porous electrodes, such as metal foams or high-porosity nonwoven carbon webs, for example, although other materials are also possible. The term "electrode" is equated in this patent application with the term "three-dimensional porous electrode".

FIG. 2 shows a standard construction of a redox flow cell of this kind from the prior art. These electrodes $6a$, $6b$ are integrated together with a permeable separating layer 4 into a cell frame, and a flow of the anolyte $8a$ and catholyte $8b$ passes through them in the X- or Y-direction during charging and discharging in each case, meaning that the oxidation or reduction reactions take place on the surface of the electrodes $6a$, $6b$. These electrodes $6a$, $6b$ are delimited externally by side elements 7. In addition to delimitation externally, the side elements in a cell stack have the function of passing on the current from one cell into the next.

In the case of flow passing through in the X- or Y-direction, the state of charge (SOC) of the electrolyte decreases in the same direction on discharging and increases in the same direction on charging, and so the electrode, the side element, and the permeable separating layer see a different concentration of the respective active species in the total surface area. If too great a change in the SOC is then achieved per unit residence time of the electrolyte in the cell, then the firstly individual components, such as the permeable separating layer, the electrodes, and the side element, for example, are loaded differently at different locations; as a result, there may easily be irreversible damage to the respective components.

Furthermore, on charging, the power of the cell is always determined by the position on the electrode at which there is the highest SOC, since otherwise secondary reactions may easily take place.

Conversely, during discharging, the power capacity of the cell is determined by the position on the electrode at which there is the lowest SOC.

For a cell with a cell design of this kind, it is necessary for these reasons for only a very low change in charge to take place per unit residence time of the electrolyte in the cell. This means that for a given current density, the electrolyte must be pumped through the cell at a relatively high rate. Consequences of this, however, are an increasing pressure drop and hence increasing pump power, leading in turn to a sharp reduction in the system efficiency.

For uniform flow through the electrodes, furthermore, a relatively high volume flow rate is also necessary.

As already mentioned above, the overall efficiency of a redox flow storage medium of this kind is reduced not only by the electrochemical losses within the individual cells but also, in particular, by the pumping energy needed to convey the electrolyte through the cells. Most of the pumping energy here is needed in order to overcome the pressure gradient within the cell. This pressure gradient is caused on the one hand by the flow-impingement channels within the cell, but also, in particular, by the flow through the electrodes.

In order to reduce the pumping energy while maintaining uniform flow distribution of the electrolyte within the cell, a variety of approaches have been proposed.

International patent application WO 2012 022532 A1 (Cellstrom) describes an optimization of the distribution channel for improving the flow-related pressure drops and for uniform flow through the electrode.

European patent application EP 0814527 A2 (Sumitomo) also describes improvement to the distribution channels into the cell, and addresses the optimum ratio between cell height and cell width. It is said that, in particular, an increase in the cell height (length of the cell in flow direction) would lead to a reduction in the efficiency of the overall system because of increasing pumping power. There is also description to the effect that making the cell wider for the purpose of increasing power may lead to an uneven flow of electrolyte.

US patent specification U.S. Pat. No. 5,648,184 (Toyo) proposes reducing the pressure drop by providing the electrodes employed with a groove that is aligned with the flow of the electrolyte. The intention thereby is to reduce the pressure drop without affecting electrode power.

US patent specification U.S. Pat. No. 6,475,661 B1 (Chemieco) includes a proposal that the pressure drop can be reduced by applying flow profiles to the bipolar plate.

Subject matter of German laid-open specification DE 3401638 A1 (Hoechst) are electrolysis cells with liquid electrolytes and porous electrodes, in which the electrolyte enters parallel to the electrode surface and is forced by at least one constriction point to flow through the electrode at least partly parallel to the flow of charge.

Aaron et al. describe how very good electrochemical results can be achieved by means of what they call a "flow-by" cell construction. For these experiments, the redox flow cell used was a modified methanol fuel cell. Through an appropriate design of the flow channels, this "flow-by" technology permits a reduction in the pressure drop, but the design of the flow channels also always has a considerable effect on the power of the cell. The authors themselves note that, while the serpentine flow channels do result in good electrochemical power, this may also be associated with a high pressure drop. Furthermore, a concept of this kind harbors the risk of diffusion into the nonwoven carbon web that is used having a limiting effect where high current densities are a target [J. Power Sour. 206 (2012) 450-453].

Tian et al. describe the application of different flow channels within the electrodes. It was shown that this can lead to a considerable reduction in the pressure drop. Apparent, however, is a very uneven distribution of electrolyte within the cell, which leads to a reduction in the power capacity of the individual cell and may easily result, owing to different flow regimes, in secondary reactions such as evolution of oxygen or of hydrogen, for example [Rare Metals 30 (Spec. Issue) (March 2012) 16-21].

According to the prior art, the flow to redox flow cells arrives from one side of the electrodes, and the electrolyte flows through the electrodes in X- or Y-direction (see FIG. 2) and departs the cell again on the opposite side. Consequently, given that the electrodes used cause a high flow resistance for the electrolyte, there are unavoidably pressure drops, which make it very difficult or even impossible, both technically and economically, to upscale the cell in the X- and Y-directions simultaneously. On the one hand, such a high pressure drop in large cells would require technically costly and inconvenient designs, and on the other hand it would also represent a safety risk. Furthermore, the pumping power needed in order to overcome the pressure drop would reduce the overall efficiency of the system to an unacceptable degree.

SUMMARY

It was an object of the present invention, accordingly, to avoid the disadvantages known from the prior art, in a reliable way, and to provide an alternative solution, for an electrochemical cell of the flow type, that reduces the pressure drop within the cell, that raises the current density, and that ensures more even flow through the electrode.

Moreover, the electrolyte ought to have an extremely uniform state of charge over the height and, at the same time, over the width of the cell, in order to reduce the likelihood of unwanted secondary reactions. A further object of the present invention was to provide a cell stack comprising the flow-type electrochemical cell of the invention, and a method for operating such a cell.

BRIEF DESCRIPTION OF THE DRAWINGS

The prior art and the present invention are represented in more detail with reference to a variety of figures:

FIG. 4: Schematic construction of a further electrochemical cell of the invention, in which flow is caused to pass through the porous electrodes perpendicularly to the permeable separating layer.

FIGS. 5a, 5b, 5c: Different arrangements of the constituents of an electrochemical cell of the invention.

FIGS. 6a, 6b, 6c: Three-dimensional representation of an electrochemical cell of the invention, comprising the different arrangements of the constituents as shown in FIGS. 5a, b, and c.

DETAILED DESCRIPTION OF THE INVENTION

The invention provides an electrochemical cell of the flow type, comprising (a) an anode half-cell and a cathode half-cell, which are bounded by side elements, and which the respective porous electrodes are comprised in the half-cells, and also (b) a permeable separating layer which is disposed between the anode half-cell and the cathode half-cell, wherein (i) an electrolyte inflow region connected to an electrolyte feed, and an electrolyte outflow region connected to an electrolyte drain, are provided, where (ii) electrolyte inflow region and electrolyte outflow region are disposed on opposite sides of the porous electrode, and so (iii) inflowing electrolyte flows through the porous electrode perpendicularly to the permeable separating layer.

Figure 1:
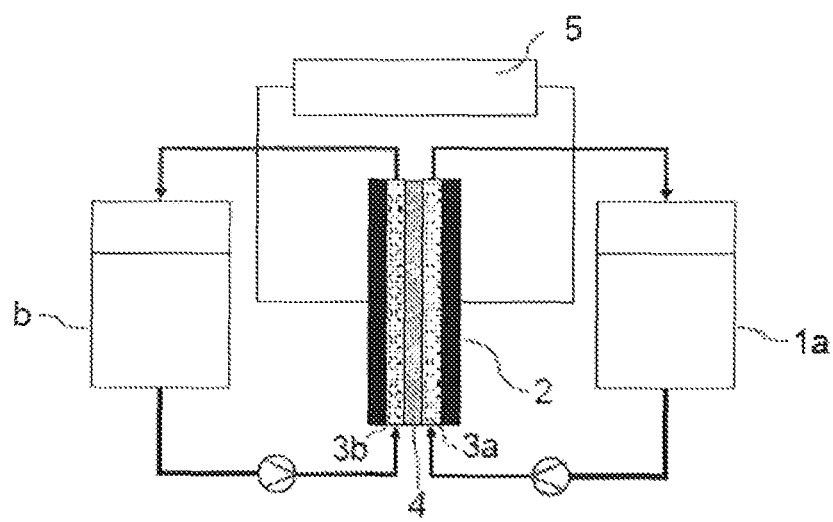
FIG. 1: Schematic representation of a redox flow storage medium from the prior art.
Figure 2:
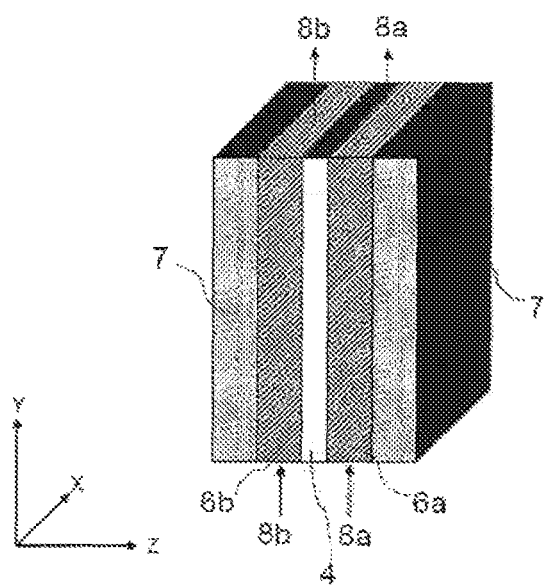
FIG. 2: Schematic construction of a redox flow cell from the prior art.
Figure 3:
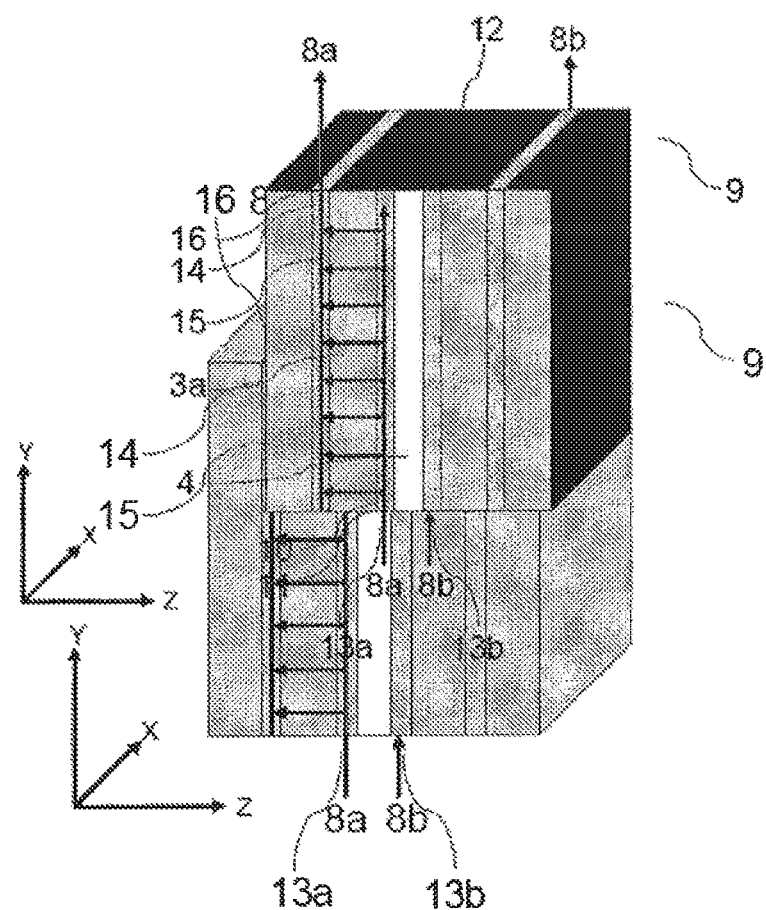
FIG. 3: Schematic construction of an electrochemical cell of the invention, in which flow is caused to pass through the porous electrodes perpendicularly to the permeable separating layer.

Surprisingly it has been found that flow through the electrode in the horizontal direction, i.e., in the z-direction relative to FIG. 3, makes the pressure drop smaller by a multiple, allowing the cell to be designed with greater dimensions.

As a result of the new, advantageous construction of the cell, moreover, the electrolyte does not have a sharply different state of charge over the height and width of the cell. As a consequence of this, the likelihood of secondary reactions is the same over the entire area of the cell, and it is therefore possible to achieve the maximum change in the SOC of the electrolyte per unit residence time in the cell, and also to operate at significantly higher current densities; as a result, a lower volume flow rate is needed, and hence less pumping power, and accordingly a higher system efficiency can be achieved.

Either liquids or gases, or else both, may constitute the flow through the flow-type electrochemical cell of the invention. Solvents used here are typically organic or inorganic acids, with preference being given to the use of aqueous sulfuric acid. Possible redox couples used are titanium, iron, chromium, vanadium, cerium, zinc, bromine, and sulfur. It is also possible, however, to use the cell of the invention as a zinc-air energy storage medium, meaning that the flow through the cell is a flow of a zinc slurry and of air or oxygen. Other such applications are conceivable as well where a salt in solution in a liquid is electrochemically reacted in an electrochemical cell, where the formation of a gas does not constitute the primary reaction.

The electrochemical cell of the invention may constitute an electrolysis cell in single-cell construction, of the type referred to as "single cell elements", as disclosed in DE 196 41125 A1 (Uhdenora), for example, or else a construction of the filter press type, as described by way of example in EP 0095039 A1 (Uhde). The side elements are therefore monopolar elements in the case of the single-cell construction, and bipolar elements in the case of the electrochemical cells of the filter press type. The respective side elements used here are configured preferably as plates, and more preferably as bipolar plates.

The permeable separating layer is selected from the group encompassing permeable membranes, selectively permeable membranes, semi-permeable membranes, diaphragms, ultra-filtration membranes, and ceramic separators.

In an advantageous embodiment, the electrolyte inflow region is disposed between the permeable separating layer and the porous electrode, and the electrolyte outflow region is disposed between the permeable separating layer and the side elements, or vice versa.

In a further advantageous refinement of the invention, the electrolyte inflow region and/or the electrolyte outflow region are integrated into the porous electrodes and/or into the side elements by means of one or more flow channels. These flow channels may be arranged parallel to one another in the porous electrode or the side elements, or may intersect. Any arrangement of flow channels is conceivable.

In a further version of the invention, in the electrolyte inflow region and/or in the electrolyte outflow region there is a wide-mesh support structure provided. This wide-mesh support structure is preferably a woven fabric or a knitted fabric or another component which ensures a defined distance between permeable separating layer and electrode and which presents a low flow resistance. In this case, in the electrolyte inflow region and in the electrolyte outflow region, the same type of design of wide-mesh support structure or a different wide-mesh support structure is used. This wide-mesh support structure is also referred to as a percolator.

The wide-mesh support structure here is made of an electrically conducting material or of a material with conductive coating, and is preferably a carbon support structure. Other materials may also be used, however. The wide-mesh support structure here has a lower flow resistance than the porous electrode and is stable with respect to the electrolyte.

It is important here that the material is sufficiently connected electrically to the porous electrode and also has effective electrical connection to the side elements. This woven fabric can be omitted if the side elements and/or the porous electrode are/is provided with corresponding flow channels which ensure unhindered flow-off of the electrolyte and which produce a sufficient electrical connection to the electrode.

At this support structure there may likewise be redox reactions, preferably but not necessarily.

The porous electrode is advantageously a nonwoven carbon web, a foam, or a metal foam. Other materials may also be used.

The construction may be expanded with further layers, these layers leading either to a more uniform electrolyte distribution or to an improved cell power, i.e., to a higher current density, a higher efficiency, or a better or more uniform current distribution or the like, or the construction may display other advantages. It is also possible for the cathode and anode half-cells of an individual cell to differ in construction, or for the construction of the two half-cells to be symmetrical.

The present invention further relates to cell stacks of an electrochemical cell of the flow type as described at the outset.

Lastly, the present invention also embraces a method for operating an electrochemical cell of the flow type, wherein electrolyte is caused to flow through a porous electrode perpendicularly to the permeable separating layer.

The method is advantageously realized such that
(i) electrolyte is supplied via an electrolyte inflow region connected to an electrolyte feed,
(ii) flow is caused to pass through the porous electrode perpendicularly to the permeable separating layer, and
(iii) the electrolyte is guided from the cell via an electrolyte outflow region which is disposed on the opposite side of the porous electrode from the electrolyte inflow region.

FIGS. 3 and 4 show electrochemical cells 9 of the invention. In these cells, electrolyte 8a, 8b flows via an electrolyte feed 13a, 13b into an electrolyte inflow region 10 which is disposed between permeable separating layer 4 and porous electrode 3a. Located in the electrolyte inflow region 10 is a wide-mesh support structure 11, also referred to as a percolator. The electrolyte inflow region 10 has a closed end 12 at the end of the electrochemical cell opposite the electrolyte feed. As a result, inflowing electrolyte 8a, 8b is forced perpendicularly to the permeable separating layer 4, i.e., in the z-direction, through the porous electrode 3a, 3b. With inflowing electrolyte 8a, 8b into the electrolyte inflow region 10 filled with a support structure 11, this region 10 initially fills uniformly with electrolyte 8a, 8b. Thereafter the electrolyte 8a, 8b flows uniformly through the porous electrode 3a, 3b, which presents a greater flow resistance than the support structure 11. From there, the electrolyte 8a, 8b flows into an electrolyte outflow region 14, in which there is provided a further wide-mesh support structure 15, which consists of the same material as or of a different material from the support structure 11 in the electrolyte inflow region 10. The electrolyte 8a, 8b subsequently departs the electrochemical cell 9 through an electrolyte drain 16.

FIG. 4 differs from FIG. 3 only in that the electrolyte outflow region 14 is integrated into the side element 7 via flow channels 17. There is then no need for the support structure.

FIG. 5 shows different arrangements of the constituents in an electrochemical cell through which flow passes perpendicularly to the permeable separating layer. FIG. 5a shows the porous electrode 6a, 6b with integrated flow channels 17 for the inflow region 10 and for the outflow region 14. In FIG. 5b, the electrolyte inflow region 10 is realized via a wide-mesh support structure 11, and the flow channels 17 are incorporated in the porous electrode 6a, 6b. In FIG. 5c, the electrolyte inflow region 10 and the electrolyte outflow region 14 are represented by way of flow channels 17. In this case the flow channels 17 of the electrolyte inflow region 10 are located in the porous electrode 6a, 6b, and the flow channels of the electrolyte outflow region 14 are located in the side elements 7. The form and arrangement of the flow channels may be selected arbitrarily here.

In FIGS. 6a, 6b, and 6c, the arrangements of constituents of an electrochemical cell as shown in FIGS. 5a, 5b, and 5c are represented in a three-dimensional view. The upper part 18 of the diagram shows the view of that side of the electrochemical cell from which electrolyte is taken out via an electrolyte drain 16, and the lower region of the diagram 19 shows the view of that side of the electrochemical cell from which electrolyte flows into the cell via an electrolyte feed 13.

The present invention is described in more detail below by means of a working example.

EXAMPLE

The pressure drop in a cell according to the prior art with an active area of 1 m$^2$ and with dimensions of 1 m×1 m can be calculated as follows:

For discharge of the electrolyte by 20% per unit residence time with an assumed power density of 500 W/m$^2$, it can be assumed that an electrolyte volume flow rate of just under 39 L/h is required. If the electrode used is a nonwoven web having a thickness of 6 mm and a permeability of 1.6 E$^{-10}$ m$^2$, and if this web, as is usual, is compressed by 25% (permeability of the compressed web 4.0 E$^{-11}$), it is possible from these figures to calculate the resultant pressure drop within the cell by the following formula:

Pressure drop=Volume flow rate*Viscosity*Length/(Permeability*Cross-sectional area)

With an average electrolyte viscosity of 1.0 E$^{-2}$ Pas, therefore, a pressure drop of around 0.6 MPa can be ascertained.

By the technique proposed in accordance with the invention, with flow through the nonwoven web in the Z-direction, under otherwise identical conditions and with the pressure drops in the inflow and outflow regions 10 and 14 disregarded, the pressure drop would reduce significantly to around 1.2*10$^{-5}$ MPa. This corresponds to a ratio of approximately 50 000:1.

Advantages resulting from the present invention:

As a result of this construction, it is possible not only to reduce the pressure drop within the cell by a multiple but also to prevent the electrolyte being present with a sharply different state of charge over the height and width of the cell. A consequence of this is that the likelihood of secondary reactions is the same over the entire area of the cell, and therefore it is possible to achieve the maximum change in the SOC of the electrolyte per unit residence time in the cell and it is also possible to operate at significantly higher current densities; as a result, a lower volume flow rate is necessary, hence less pumping power, and therefore a higher system efficiency can be achieved. Furthermore, the individual components such as permeable separating layer, electrode, and side element see the same state of charge over the height and width, and this has positive consequences for cell performance and component durability.

This provides the possibility for electrochemical cells with electrodes consisting of a nonwoven web or the like to be produced and to be operated economically with a greater geometrical dimension than in the state of the art to date.

LIST OF REFERENCE SYMBOLS

1 Tanks
2 Electrochemical cell
3a, 3b Porous electrodes/nonwoven web
4 Permeable separating layer
5 Network connection
6a, 6b Nonwoven web/porous electrode
7 Side element
8a Anolyte
8b Catholyte
9 Electrochemical cell of the invention
10 Electrolyte inflow region
11 Wide-mesh support structure/percolator
12 Closed end of the electrolyte inflow region
13a, 13b Electrolyte feed
14 Electrolyte outflow region
15 Further support structure (percolator)
16 Electrolyte drain
17 Flow channels
18 Upper region of FIG. 6
19 Lower region of FIG. 6

The invention claimed is:

1. A flow type electrochemical cell, comprising:
an anode half-cell and a cathode half-cell bounded by side elements, each half-cell further comprising porous electrodes;
a permeable separating layer disposed between the anode half-cell and the cathode half-cell;
an electrolyte inflow region connected to an electrolyte feed; and
an electrolyte outflow region connected to an electrolyte drain;
wherein:
the electrolyte inflow region and the electrolyte outflow region are disposed on opposite sides of the porous electrode;
inflowing electrolyte flows through the porous electrode perpendicularly to the permeable separating layer; and
at least one of the electrolyte inflow region and the electrolyte outflow region further comprises a wide-mesh support structure, wherein the wide-mesh support structure presents a lower flow resistance than the porous electrode.

2. The electrochemical cell of claim 1, wherein:
the electrolyte inflow region is disposed between the permeable separating layer and the porous electrode; and
the electrolyte outflow region is disposed between the porous electrode and the side elements, or vice versa.

3. The electrochemical cell of claim 1, wherein:
the electrolyte inflow region is disposed between the porous electrode and the side elements; and the electrolyte outflow region is disposed between the permeable separating layer and the porous electrode.

4. The electrochemical cell of claim 1, wherein at least one of the electrolyte inflow region and the electrolyte outflow region is integrated into at least one of the porous electrodes and the side elements by means of one or more flow channels.

5. The electrochemical cell of claim 1, wherein the wide-mesh support structure is a woven fabric or a knitted fabric.

6. The electrochemical cell of claim 1, wherein the wide-mesh support structure is made of an electrically conducting material or of a material with electrically conductive coating.

7. The electrochemical cell of claim 1, wherein the wide-mesh support structure represents a carbon support structure.

8. The electrochemical cell of claim 1, wherein the porous electrode comprises a nonwoven carbon web, foams, or metal foams.

9. A cell stack of a flow type electrolytic cell as claimed in claim 1.

10. A method for operating a flow type electrochemical cell, wherein flow of an electrolyte is caused to pass through the porous electrode perpendicularly to the permeable separating layer;

wherein:
- the electrolyte is supplied via an electrolyte inflow region connected to an electrolyte feed;
- the electrolyte is guided from the cell via an electrolyte outflow region which is disposed on the opposite side of the porous electrode from the electrolyte inflow region; and
- at least one of the electrolyte inflow region and the electrolyte outflow region further comprises a wide-mesh support structure, wherein the wide-mesh support structure presents a lower flow resistance than the porous electrode.

\* \* \* \* \*